T. W. W. FORREST ET AL

METHOD OF AND APPARATUS FOR REMOVING PITS FROM PRUNES

Nov. 29, 1932. Original Filed May 31, 1927 Re. 18,675

INVENTORS
Thomas W. Forrest
Thomas O. L. Smith
BY Miller and Boykin
their ATTORNEYS.

Reissued Nov. 29, 1932

Re. 18,675

UNITED STATES PATENT OFFICE

THOMAS W. W. FORREST, OF FRESNO, AND THOMAS O. L. SMITH, OF OAKLAND, CALIFORNIA, ASSIGNORS TO SUN-MAID RAISIN GROWERS OF CALIFORNIA, OF FRESNO, CALIFORNIA, A CALIFORNIA COOPERATIVE ASSOCIATION

METHOD OF AND APPARATUS FOR REMOVING PITS FROM PRUNES

Original No. 1,715,700, dated June 4, 1929, Serial No. 195,534, filed May 31, 1927. Application for reissue filed November 18, 1929. Serial No. 408,143.

The invention relates to a method of and apparatus for removing pits from dried or fresh prunes, and covers the subject matter of our abandoned application filed under Serial No. 618,472, on Feb. 12, 1923.

An object of the invention is to provide a method of removing pits from dried or fresh prunes, which will result in the minimum possible mutilation of the prune.

Another object of the invention is to provide a method of removing the pit from a dried or fresh prune by making only one hole in the prune, through which the pit is ejected.

A further object of the invention is to provide an apparatus for rapidly and effectively removing the pits from dried or fresh prunes, without unduly puncturing the skin of the prunes or unnecessarily mutilating the prunes.

A further object of the invention is to provide a machine adapted to successively perform the operation of making a cut in the skin of the prune and ejecting the pit through said cut, without otherwise rupturing or perforating the skin of the prune.

The invention possesses other advantageous features, some of which with the foregoing, will be set forth at length in the following description, where we shall outline in full the process of our invention and one form of apparatus for carrying it into effect. In the accompanying drawing we have shown one form of apparatus embodying our invention, but it is to be understood that we do not limit ourselves to such form, since the invention as set forth in the claims, may be embodied in a plurality of forms.

Referring to said drawing.

Figure 2:
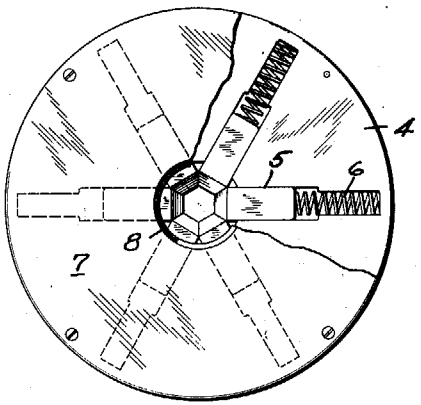
Fig. 2 is a plan view of the table, a portion thereof being broken away to disclose the construction.

In accordance with the process of our invention we make a cut in the skin of the prune adjacent one end of the pit, so that the pit is pointed substantially towards the cut. The pit of a prune is somewhat elongated and has rather sharp ends and the cut is made in the skin adjacent one end of the pit. The prune is then supported adjacent the cut, with the cut portion overlying an aperture. By exerting pressure against the opposite side of the prune the pit is expelled through the cut in the skin and through the aperture, and the pressure is preferably exerted against the opposite side of the prune in such manner that the skin is not broken or punctured. Therefore only one hole is made in the skin of the prune, through which the pit is ejected, and the prune is not deleteriously deformed or mutilated, so that its market value is in no manner interfered with. In fact, the process accomplishes such a clean expulsion of the pit that a casual observance of the prune will not indicate that it has been pitted, and no meat is lost as the pit is scraped clean by the action of a special table through which the pit is forced.

The machine of our invention comprises a suitable frame or pedestal 2 upon which the operative elements of the machine are arranged. In the construction shown in the accompanying drawing, the frame is constructed to be attached to a bench or table 3, but it is to be understood that the frame may be extended downward to independently support the machine on the floor. Secured to or mounted on the frame 2 is a table 4 on which the prunes are pitted. The table is provided with a variable aperture above which the prune is placed and this aperture is preferably formed by a plurality of radially disposed, radially movable slides 5, which contact with each other at the center of the table to form the variable aperture.

The slides are pressed toward the center of the table by springs 6 and are disposed in grooves or slots in the table. The table is usually provided with a cover plate 7 having a central aperture 8 which is greater in diameter than the maximum variable aperture required.

Arranged above the table and positioned concentrically with respect to the aperture therein is a basket or other suitable means for positioning the prunes above the aperture. This basket 9 is preferably mounted on the table or on the frame of the machine and comprises a ring 12 having dependent resilient fingers 13. The prune 14 is positioned in the basket in such position that the longitudinal axis of the pit 15 is alined with the aperture in the table.

Disposed above the basket and slidably mounted for vertical movement in the frame is a hollow presser foot 16, preferably cylindrical in shape, which is provided with a serrated or irregular lower face 17. After the prune has been placed in position on the table, the presser foot is moved downward to press the prune firmly against the table and to hold it in such position during the operation of the pit expelling means. By providing the serration on the lower edge of the presser foot the pit is held in position in axial alinement with the aperture in the table. This condition is further enhanced by the provision of the cavity within the presser foot, and the concavity of the lower face of the presser foot.

Disposed below the table in alinement with the aperture therein is a cutting instrument or punch 18 having blades 19 on its upper face, which is adapted to be elevated to puncture or make a small cut in that portion of the skin of the prune which directly overlies the aperture in the table. The punch 18 is normally held in its depressed position by the spring 21, but after the presser foot has descended to firmly press the prune against the table, the punch 18 is moved rapidly upward to perforate the skin on the underside of the prune. Means are provided for releasing the punch 18 immediately after it has perforated the skin of the prune, to permit the spring 21 to remove the punch from the aperture in the table, so that the pit may be ejected therethrough.

Figure 3:
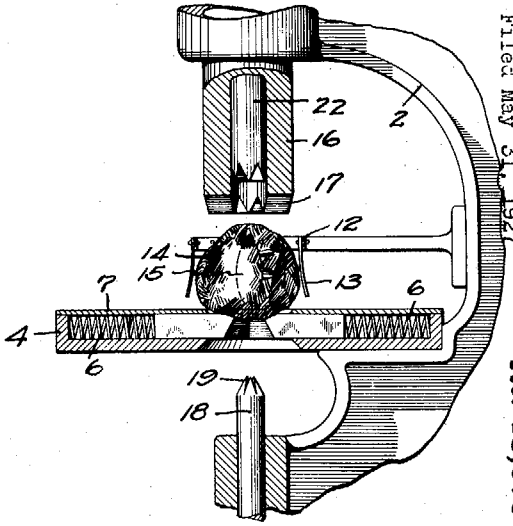
Fig. 3 is a vertical section taken through the table and the pit ejecting means.
Figure 4:
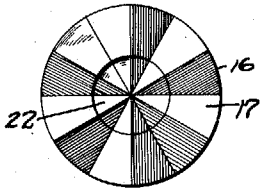
Fig. 4 is an underneath view of the presser foot and ejecting plunger.
Figure 1:
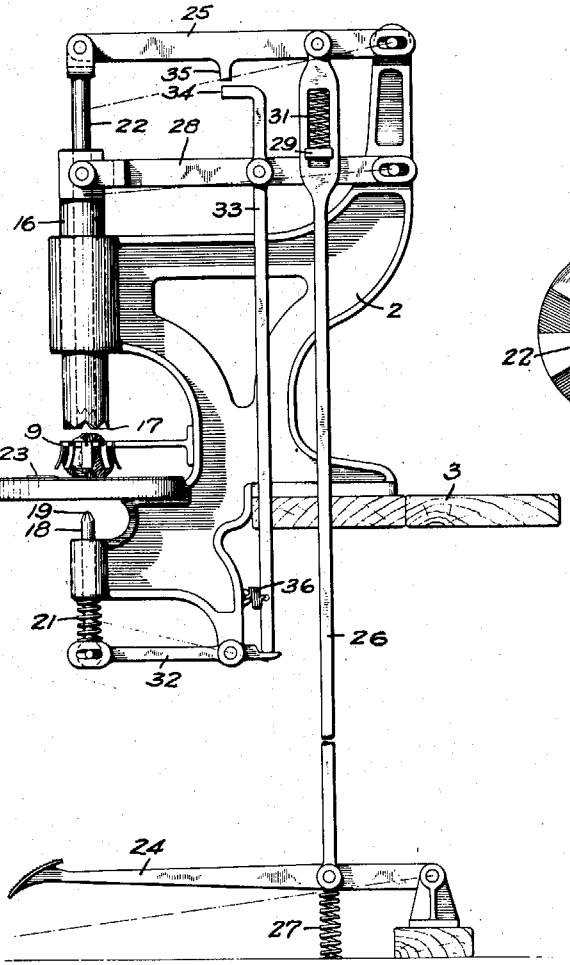
Fig. 1 is a side elevation of a machine embodying our invention.

Slidable within the hollow presser foot 16 is a plunger 22 which normally is so positioned that its lower end lies above the lower end of the presser foot. After the presser foot has firmly positioned the prune and the punch has perforated the underside of the prune, the plunger moves downward against the prune and presses the pit from the prune through the aperture in the table. The lower edge of the plunger is preferably serrated or cruciform in shape so that it does not have a tendency to cause the pit to be tilted from its position of alinement with the aperture in the table, but forces the pit directly through the aperture. This plunger does not break the skin of the prune on that side opposite the aperture but merely exerts a firm pressure against the prune to eject the pit therefrom. It sometimes happens that some shreds of skin or meat of the prune are pressed into the aperture with the pit and these shreds are subsequently removed by passing a flat knife 23 under the prune while it remains on the table, thus cutting off the shreds. As the pit is being ejected from the prune the slides 5 move backward to properly shape the variable aperture in the table to the cross sectional area of the pit. The pit is therefore forced through an aperture, the walls of which contact tightly with the pit, holding back any meat which tends to follow the pit and scraping this meat from the pit so that the pit as it is ejected from the table is comparatively clean. The slides are preferably made of steel but they may be made of any other suitable material, such as hard rubber. The ends of the slides which form the side walls of the aperture are preferably beveled at their upper edges so as to form a shallow seat for the meat of the fruit as clearly shown in Fig. 3, and the lower edges are tapered upwardly so as to present a sharp edge over which the pit passes as it moves through the aperture, and assist in the ejection of the pit.

Means are provided for successively operating the various operative elements of the machine and this means preferably comprises a unitary element such as a manually operated lever which is so connected to the various operated mechanisms that movement of the lever causes successive operations of the elements. The various operating mechanisms are mounted on the frame 2 and in the present instance are operated by a foot lever 24 although it is to be understood that the machine may be power-driven when desired. The plunger 22 is operated by the lever 25 pivotally supported at one end on the frame. Connected to the foot lever 24 is a rod 26 which at its upper end is pivotally connected to the lever 25 so that downward movement of the foot lever 24 causes downward movement of the plunger 22. The rod 26 and its cooperating element are normally held in elevated position by the compression spring 27, the spring being of sufficient strength to return the parts to elevated position after the depression of the foot lever. The presser foot 16 is operated by the lever 28 pivotally connected to the frame and resiliently connected to the rod 26 by means of the cross pin 29 and the spring 31. When the foot lever is depressed the plunger 22 and the presser foot 16 move downwardly simultaneously until the downward movement of the presser foot is arrested by engagement with the prune. Further downward movement of the foot pedal causes compression of the spring 31 without causing any material further downward movement of the presser foot 16 and during this further downward movement of the foot lever the plunger 22 is moved downward to eject the pit from the prune.

Pivotally mounted below the table is a lever 32 which is connected to the punch 18, the lever 32 being so arranged that downward movement of its free end causes upward movement of the punch. The two lever arms of the lever 32 are of materially different lengths so that the punch is moved upward rapidly. The lever 32 is operated by the rod 33 pivoted to the lever 28 so that as the lever 28 is moved downward the punch is moved upward. Means are provided for tripping the rod 33 from engagement with the lever 32 to permit the spring 21 to return the punch 18 to its lower position. Formed on the upper end of the rod 33 is an offset 34 which is positioned below a projection 35 on the lever 25. As the levers 25 and 28 move downward simultaneously, during the initial operation of the machine the relation of the projection 35 and the offset 34 remain constant. When the presser foot reaches its lower position the further downward movement of the lever 25 brings the projection 35 into contact with the offset 34 thus rocking the rod 33 on its pivot, out of engagement with the ends of the lever 32, thus permitting the punch 18 to drop. On the return movement of the levers 25 and 28 upward the rod 33 is moved into position over the end of the lever 32 by the spring 36.

The operation of the machine is as follows.

The prune is placed in the basket 9 with the longitudinal axis of the pit perpendicular and disposed above the aperture in the table. The foot lever 24 is then depressed causing first the downward movement of the presser foot 16 to compress the prune against the table; second, the upward movement of the punch 18 to perforate the skin of the prune lying directly above the aperture; third, the release of the punch, and forth, the downward movement of the plunger against the top of the prune to force the pit from the prune through the aperture in the table. In this downward movement of the plunger, the lower end of the plunger projects slightly downward below the lower end of the presser foot, but owing to the compression of spring 31 urging the presser foot still further downward it follows the downward movement of the plunger, thus aiding in compressing the soft body of the prune while supporting it against displacement or rupture, thus the combined action of punch and presser foot results in pushing against the prune and completely ejecting the pit from the prune but without rupturing or perforating the skin of the prune at that point where the presser foot contacts with the prune. The pit is therefore removed from the prune and the skin of the prune is opened only to the extent that is necessary to permit the passage of the pit therethrough.

We claim:

1. The method of removing the pit from a dried prune which comprises making a small cut through the skin of the prune at one end and exerting pressure against the opposite end of the prune without rupturing the fruit at said opposite end whereby to expel the pit through the cut.

2. The method of removing the pit from a dried prune which comprises supporting the prune on one end on an apertured backing with the longitudinal axis of the pit alined with the aperture and exerting pressure against the opposite end of the prune without rupturing the fruit at said opposite end whereby to force the pit through the first mentioned end and the aperture of the backing.

3. The method of removing the pit from a dried prune which comprises making a small cut through the skin of the prune at one end, supporting that portion of the prune surrounding the cut and exerting pressure against the opposite end of the prune without rupture of said opposite end whereby to expel the pit through the cut.

4. An apparatus for removing pits from prunes comprising an apertured support for a prune, means operating through the aperture for cutting the skin of the prune at its supported end and means for exerting pressure against the opposite end of the prune without rupture of the fruit for forcing the pit through the cut and aperture.

5. An apparatus for removing pits from prunes, comprising a support having a plurality of radial slides forming an aperture at their juncture, means for positioning a prune on the support above the aperture, means for cutting the skin of the prune where it overlies the aperture and means for exerting a downward pressure against the upper surface of the prune to force the pit through the aperture.

6. An apparatus for removing pits from prunes, comprising a support, a plurality of radially movable, resiliently pressed slides mounted on the support and forming a variable aperture at their juncture, means for positioning a prune on the support above the aperture and means for exerting a downward pressure on the upper surface of the prune to force the pit through the aperture.

7. An apparatus for removing pits from prunes comprising a support, a plurality of radially movable resiliently pressed slides mounted on the support and forming a variable aperture at their juncture, means for positioning a prune on the support above the aperture, means for cutting the skin of the prune where it overlies the aperture and means for exerting a downward pressure against the upper surface of the prune to force the pit through the aperture.

8. An apparatus for removing pits from prunes comprising a support having an aperture therein on which a prune is adapted to be supported, a hollow presser foot having a serrated face adapted to press the prune against the support and position the pit in alinement with the aperture, and a plunger arranged within the presser foot adapted to cooperate with said presser foot to press against the outer surface of the prune to expel the pit from the prune.

9. An apparatus for removing the pit from a prune comprising a support having an aperture therein on which a prune is adapted to be supported, a hollow presser foot adapted to press the prune against the support, a cutter arranged to cut the skin of the prune directly overlying the aperture, a plunger arranged within the presser foot adapted to cooperate with said presser foot and compress the prune by pressing against its outer surface to expel the pit from the prune, and unitary means for successively operating said presser foot, cutter and plunger.

10. In a fruit-pitting device of the character described, a pit scraper comprising a plurality of radially disposed retractible elements arranged in a transverse relation to the fruit so as to form an expansible circle around the fruit for allowing the fruit pit to be forced therethrough and for simultaneously scraping the meat of the fruit from the pit.

11. A pit scraper, as defined in claim 10, in which the said elements are slightly tapered at their upper faces toward the center so as to form a seat for the meat of the fruit.

12. A pit scraper, as defined in claim 10, in which the said elements are slightly tapered at their upper faces toward the center so as to form a seat for the meat of the fruit and in which the corresponding bottom faces are tapered to present a sharp scraping edge and to assist in pushing the pit out of the device.

In testimony whereof I have hereunto set my hand this 16th day of October, 1929.

THOMAS W. W. FORREST.

In testimony whereof I have hereunto set my hand this 26th day of October, 1929.

THOMAS O. L. SMITH.